June 22, 1937.   R. G. GRISWOLD   2,084,954
GAS ANALYZING PROCESS
Filed Jan. 28, 1932
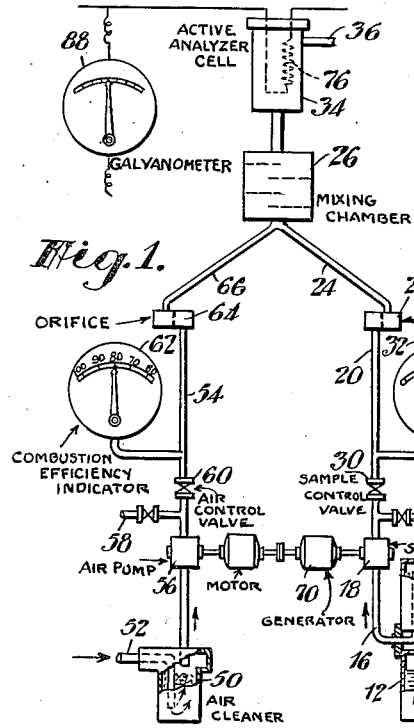
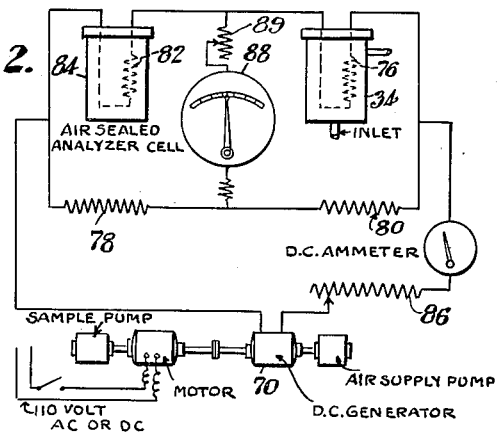
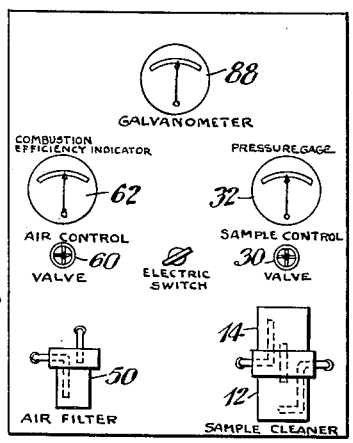
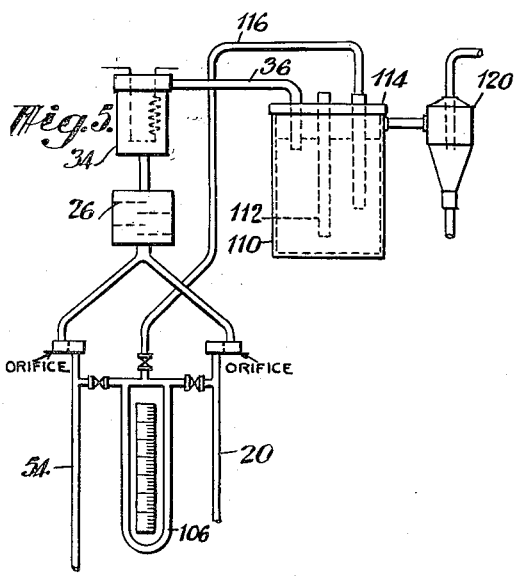
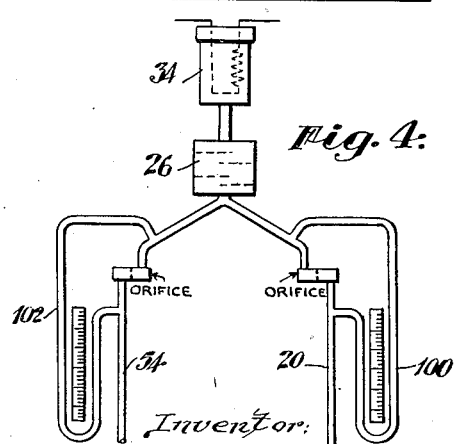
Inventor:
Robert G. Griswold
By Edmund G. Borden
ATTORNEY Patented June 22, 1937

2,084,954

UNITED STATES PATENT OFFICE 2,084,954

GAS ANALYZING PROCESS

Robert G. Griswold, Westfield, N. J., assignor to Power Patents Company, Jersey City, N. J., a corporation of Maine Application January 28, 1932, Serial No. 589,365

13 Claims. (Cl. 23—232)

This invention relates to combustion control, and more particularly, it relates to a method for rapidly and accurately controlling the feeding of one element of combustion to a combustion zone. It is of special utility in connection with the control of combustion within an internal combustion engine of the automotive type.

The exhaust gases from internal combustion engines vary in their content of reducing gases such as hydrogen, carbon monoxide, methane and the like, in accordance with the efficiency of the combustion producing them. It has been determined that for all practical purposes as applied in the practice of the present invention, the rate of variation of each of the reducing gases ordinarily met in such exhaust products, is substantially a straight line function of the efficiency of the combustion operation,—the percent of reducing gases varying inversely with such combustion efficiency.

According to the present invention instrument calibration is first effected by conducting a definite and constant flow of exhaust gases of known composition and temperature into a sealed gas analyzer cell in admixture with a definite excess volume of air. The combustion components of the gas-air mixture are caused to react in said cell in well known manner by contact with a heated wire forming one leg of a Wheatstone bridge circuit or the equivalent, supplied with electric current from a source of constant potential. The increase in electric resistance which develops in the wire by reason of the increased temperature resulting from the reaction is indicated by a galvanometer in the Wheatstone bridge circuit, and the galvanometer is thereby calibrated to register a "selected" value of current flow or wire temperature developed when the gas-air mixture of definite known composition flows through the analyzer. This process is repeated with exhaust gases containing varying percentages of combustible components, in each case keeping all conditions constant except the amount of air added; the air flow rate being adjusted to bring the galvanometer reading to the "selected" value. The percentage of reducing gases in a sample of automotive exhaust gas of unknown composition can then be determined by measuring the volume of air which must be added thereto in order to develop a temperature in the heated wire and a galvanometer reading corresponding to the "selected" galvanometer reading developed by the gas of known composition. In other words, with a gas of unknown composition supplied at the same rate and temperature as the gas of known composition, the amount of air mixed with the gas of unknown composition is varied until the current flowing through the galvanometer circuit returns the galvanometer needle to the position which it occupied when the gas-air mixture of known composition was flowing through the analyzer. The amount of combustibles in the exhaust gas sample of unknown composition, and the combustion efficiency of the engine from which this sample was derived, may then be read on the scale of a pressure gauge or flow meter which is positioned to measure the amount of air flowing through the analyzer cell, (the pressure meter or flow meter previously having been calibrated with gas-air mixtures of known compositions while the electric current in the galvanometer circuit was maintained at the "selected" value).

Referring now to the accompanying drawing illustrating the invention:

Fig. 1 shows diagrammatically one form of fluid flow control apparatus and portions of the associated electric circuit of the gas analyzer;

Fig. 2 shows in diagrammatic form, the galvanometer circuit and certain associated parts;

Fig. 3 is a front view of an instrument panel adapted for use with the invention;

Fig. 4 is a diagrammatic view of another modification of the invention; and,

Fig. 5 shows diagrammatically still another modification.

Referring to Fig. 1 of the drawing, there is shown a gas inlet 10 to which the exhaust gases to be analyzed flow from an engine of other source thereof through a suitable sampling device, preferably of the type described in the copending application of J. D. Morgan, Serial No. 482,283, filed September 16, 1930, for Carbureter and spark adjusting instruments. The gas treating equipment comprises a water separator and oil filter 12 directly connected in suitable manner with a dry cleaner or filter 14, the latter of which contains cotton or other suitable filtering substance. The gas to be analyzed is drawn from the filter 14 through a conduit 16, by means of a rotary pump 18, and thence flows through the pressure chamber or conduit 20, constant orifice chamber 22, and line 24, to a baffled mixing chamber 26. A valve-controlled discharge line 28 connected with the line 20 facilitates the discharge of excess gas forced into the former by the pump or blower, whereby a selected pressure may be uniformly maintained in the line 20 by means of a valve 30 therein. A calibrated pressure gage 32 is also inserted in the line 20.

The outlet of mixing chamber 26 is connected with one end of a closed reaction tube or housing 34, the gas outlet 36 of which may be arranged to discharge to waste or as hereinafter described.

For introducing air or other reactive gas into the analyzer with the exhaust gases to be examined, there are provided means including an air cleaner 50 having an air inlet 52. From the air cleaner purified air is forced into an air pressure chamber or conduit 54 by means of a rotary pump 56 or the like. The chamber 54 has connected therewith a discharge line 58, control valve 60, and pressure gage 62, similar respectively to the line 28, valve 30 and gage 32. It is in communication with the mixing chamber 26 through the constant orifice member 64 and conduit 66.

In the arrangement shown in Figs. 1 and 2, the respective rotary pumps 18 and 56 are driven by means of a motor generator set, the motor of which may be driven from either a source of A. C. or D. C. current, under control through the usual switch. The generator 70 is designed to generate a D. C. current of constant potential for use in a galvanometer circuit, hereinafter described.

Disposed within the tube or cell 34 in the form of a straight or spiral wire is a catalytic element 76 forming part of a Wheatstone bridge circuit, the latter of which also comprises a pair of fixed resistances 78 and 80, a second catalytic resistance element 82 similar to the element 76 of tube 34 arranged within a closed tube 84, a variable resistance 86, a galvanometer 88, a galvanometer variable resistance 89 and a source of constant electric potential, shown in Fig. 2, as the generator 70. Sealed within the tube 84 is a comparator gas which may be air; or a gas having a thermal conductivity outside the range of thermal conductivity of the exhaust gases to be examined may be used as the comparator gas.

In the preferred practice of the invention, with the apparatus above described, the gas to be analyzed is introduced into the system through a gas inlet 10, is scrubbed and filtered, and thence is forced by the pump 18 into the chamber or tube 20 within which a constant pressure is maintained in well-known manner. The gas then flows through the orifice 22 to the mixing chamber, where it is mixed with varying quantities of air, gaged as hereinafter described. The gas-air mixture flows around the baffles in the mixing chamber and thence passes through the cell 34 containing the catalytic wire 76.

In this cell the gas is burned in contact with the catalytic element which may, for example, be a wire of platinum or palladium, or a suitable alloy such as one of platinum and iridium or the equivalent. The platinum wire is normally maintained at a suitable temperature, preferably in the neighborhood of 900° F. or below, by the electric current flowing therethrough.

The heat developed by the combustion of the gases passing through the cell 34 may cause deflection of the needle of the galvanometer 88. The galvanometer has been previously calibrated with gas mixtures of known composition, so that when gases of unknown composition are examined the needle is brought to the selected point on the galvanometer scale,—preferably a point near the center of the scale, by manipulation of air valve 60, as previously described.

Likewise the air pressure gage 62 has been so calibrated that, with a given flow of exhaust gases of known composition to the mixing chamber and analyzer cell 34, the various air pressures required to maintain the galvanometer indicator at the point selected through suitable air flow to the cell, as described above, indicate the percentage of combustion efficiency of the combustion operation from which the exhaust gases are obtained. The variable resistance 89 in the galvanometer circuit governs the sensitivity of the galvanometer. The current for the Wheatstone bridge circuit conveniently may be produced by a motor driven six-volt D. C. generator.

In the course of many analyses of exhaust gases obtained from various internal combustion engines of the automotive type, it has been determined that when combustion efficiencies of from 50 to 100% have obtained,—the hydrogen content of the exhaust gases has varied from around 7% to around .2%, the carbon monoxide content has varied from around 13% to around 1.2%, and the hydrocarbon content, generally mostly methane, varies from around 1.7% to about .1%. As already indicated,—the rate of decrease of the percentage of each of these combustible components is approximately a straight line function of and inversely proportional to the percentage of completeness of the combustion producing the gas mixture containing them.

Normally the exhaust gas obtained from a motor operating at around 50% combustion efficiency requires for completing the combustion of the combustible constituents therein, around 67% of its volume of air. However, in order to maintain the temperature within the analyzer cell 34 within a range at which it may have a long life, it is preferable to employ an amount of air two or more times that actually required for completing the said combustion of the said constituents. The air pump therefore should have a capacity some two or three times greater than the gas pump; and the valves in the lines 54 and 58 should be adjusted accordingly. The amount of air employed with a gas of composition corresponding to that of the gas by which the galvanometer has been calibrated will thereafter remain constant during use of the gas analyzer.

In examining a sample of exhaust gases of unknown composition, the gas sample is introduced into the mixing chamber together with air from the line 54, and thence flows through the cell 34. The resultant combustion in the cell may cause deflection of the galvanometer needle one way or the other from the preselected scale reading adopted as a standard, in accordance with variations in the composition of the gas with respect to that of the gas of known composition against which the instrument was calibrated. By changing the adjustment of the air valve 60, a point is reached at which the galvanometer needle will again rest at the selected point. The calibrated pressure gauge 62 on the air line will then read directly either the percentage of the combustible constituents in the exhaust gases being analyzed or the efficiency of the combustion producing such gases.

It is within the purview of the invention to substitute for the pressure gages 32 and 62 other suitable means for indicating the rate of flow of the respective gases by the differences of pressure across the orifices 22 and 64. Fig. 4 shows a suitable construction including a manometer tube 100 having one end connected with the gas pressure chamber or line 20, the other end thereof being connected with the line 24 beyond the orifice 22.

Likewise a second manometer 102 has one end thereof connected with the air pressure chamber or line 54, its other end being connected with the line 66 beyond the orifice 64. Suitable manometer scales are employed; and that on the air line is calibrated to read in terms of combustion efficiency or percent of combustible constituents in the exhaust gases.

When desired, the upper part of the respective gas and air pressure lines 20 and 54 may be interconnected by means including a manometer tube 106. The latter is provided with a scale, and is calibrated to give an accurate indication of the relative rates of gas flowing through the chambers 20 and 54. Fig. 5 illustrates a construction of this type. Provision is made in this modification for the maintenance of a constant pressure within either the air chamber 54 or the gas chamber 20 and a constant but lower pressure in the analyzer cell 34, irrespective of frictional resistance of intervening elements of the analyzer unit. The construction includes a well 110 open to the atmosphere through the open-ended tube 112 mounted in the top member 114. The cell outlet member 36 extends downwardly into the well 110 for a short distance below the level of water or other liquid therein. A valved conduit 116 has one end connected with the manometer tube 106, the other end extending downwardly a substantial distance below the level of the liquid in the well 110. A siphon 120 is connected with the well 110 above the surface of the liquid therein, and is adapted for creating a uniform suction therein. The manometer tube 106 has valves in the respective arms thereof as shown, for the purpose of connecting either the gas or air pressure chambers 20, 54 with the well 110, when and as desired. When employed in the modification of the invention first described, line 116 may be directly connected with the air line 54. The pressure of the gas in the space above the liquid in the well 110 can then only be reduced to a point where air bubbles flow through the liquid from the pipe 116. The flow of gas may be regulated by adjusting the depth to which pipe 116 is immersed in the well 110.

While in the form previously described a calibrated combustion efficiency indicator is in the form of a pressure gage or flow rate manometer in the air line to the mixing chamber, it will be obvious to those skilled in the art that the arrangement of parts may be reversed and a uniform flow of air to the mixing chamber be maintained, while varying the pressure upon the sample of gas flowing to the mixing chamber or the rate of flow thereof. In such cases the gage on the gas line 20 is previously calibrated to read in terms of combustion efficiency of the gas being examined. Likewise the pressure on both the air and gas flowing through the respective lines 20 and 54, or the rates of flow of the gases through the respective orifices 22 and 64, may be concurrently varied, in which case the air and gas gages, or corresponding flow meters, preferably should be calibrated for concurrent or matched combustion efficiency designations. Furthermore, instead of using calibrated pressure gages, it is possible to provide the valve 60 and/or valve 30 with a dial upon which are marked the percent combustion efficiencies, the latter of which then may be designated by pointers directly secured to the valve stems of sensitive needle valves or the like.

While the concentration of combustible gases in the exhaust gases from internal combustion motors frequently runs as high as 20%, and even higher,—it is preferred to maintain the concentrations of combustible gases in the mixture passing to the analyzer cell 34 at not more than 7%. This greatly facilitates the continued efficient operation of the catalyst in the analyzer cell without substantial deterioration. This control of the concentration of the combustible constituents in the gas mixtures being analyzed is effected by suitable adjustment of the amount of excess air uniformly supplied to the gas mixture passing through the cell 34 in the manner already described.

While in the above described specific embodiments of the invention, the use of a Wheatstone bridge circuit and a catalytic cell has been indicated, it is within the scope of the invention to substitute therefor one or more thermocouples or their equivalents, located in a suitable electric current flow balancing circuit.

There may be substituted for the air hereinbefore specifically mentioned other reactive gases such as oxygen-enriched air and chlorine,—capable of reacting with the combustible constituents of the combustion gases being analyzed.

Similarly it is within the purview of the invention to substitute for the reactive gases for the purpose of diluting the exhaust gases and reducing the combustible components thereof to the desired degree,—an inert gas fluid medium such as nitrogen, or superheated steam. When such inert fluids are used,—substantially no combustion occurs in the analyzer cell 34; and the catalytic element 76 is maintained preferably at around 250° C. during measurement of the thermal conductivity of the gas mixture flowing through the cell 34. The composition of this gas mixture is varied in the manner already described to maintain a flow in the galvanometer circuit of an electric current of selected magnitude. The amount of the inert fluid used for thus adjusting the composition of the gas mixture to maintain the desired current flow measures the percentage of combustible constituents in the gases being examined.

The invention is susceptible of modification within the scope of the appended claims.

I claim:

1. The method of analyzing exhaust gases from an internal combustion motor which comprises mixing a uniform volume of the gas to be analyzed with a reactive diluting gas, passing the mixture over a heated wire whereby the diluting gas is activated causing a temperature change in the wire from a preselected standard temperature ascertained by passing a like volume of exhaust gases of known composition admixed with a preselected volume of said diluting gas thereover while supplying energy to said wire from a source of constant potential, adjusting the amount of the said diluting gas to that required for bringing the wire again to the said standard temperature and for maintaining it there, and measuring the amount of diluting gas thus employed.

2. The method of analyzing exhaust gases from an internal combustion motor which comprises mixing a uniform volume of the exhaust gases with a combustion-supporting gas, passing the mixture over a heated wire thereby causing combustion in the gas mixture in contact with the wire and a corresponding temperature change in the wire from a preselected standard ascertained by passing a like volume of exhaust gases of known composition admixed with a definite volume of said combustion-supporting gas thereover while supplying energy to said wire from a source of constant potential, adjusting the amount of the combustion-supporting gas mixed with the exhaust gases to again bring the wire to the preselected standard temperature and maintain it there, and measuring the amount of combustion-supporting gas thus required.

3. The method as defined in claim 2, according to which the gas mixture being passed over the heated wire contains sufficient combustion-supporting gas to bring the combustible constituents of the mixture to not more than 7% thereof.

4. The method of analyzing exhaust gases from an internal combustion motor which comprises flowing into contact with a heated catalyst in a galvanometer circuit a gas mixture containing a uniform volume of the said exhaust gases and a regulated amount of a gas reactive to a component of the exhaust gases in the presence of the catalyst, and adjusting the flow of the said reactive gas to a rate at which a preselected temperature is maintained in the said heated catalyst, said preselected temperature having been ascertained by passing a like volume of exhaust gases of known composition admixed with a definite volume of said reactive gas over the catalyst, while supplying energy to said catalyst from a source of constant potential, and measuring the rate of flow of the said reactive gas required to maintain such preselected temperature.

5. The method of analyzing exhaust gases from an internal combustion motor which comprises flowing into contact with a heated catalyst in a galvanometer circuit a gas mixture containing a uniform volume of the said exhaust gases and a regulated amount of a combustion-supporting gas flowing from a source thereof maintained under positive pressure, and adjusting the partial pressure of the said combustion-supporting gas in the gas mixture during contact of the latter with the catalyst, thereby to maintain a constant preselected flow of electric current in the galvanometer circuit, said preselected current flow having been ascertained by passing a like volume of exhaust gases of known composition admixed with a preselected volume of combustion-supporting gas over said catalyst, while supplying energy to said catalyst from a source of constant potential, and measuring the pressure on the said source of the combustion supporting gas required to maintain such electric current flow.

6. The method of analyzing exhaust gases from an internal combustion motor which comprises flowing into contact with a heated catalyst in a galvanometer circuit a gas mixture containing a uniform volume of a combustion-supporting gas and a regulated amount of the said exhaust gases flowing from a source thereof maintained under positive pressure, and adjusting the partial pressure of the said exhaust gases in the gas mixture during contact of the latter with the catalyst, thereby maintaining a constant preselected flow of electric current in the galvanometer circuit, said preselected current flow having been ascertained by passing a like volume of combustion-supporting gas admixed with a preselected volume of the said exhaust gases over said catalyst, while supplying energy to said catalyst from a source of constant potential, and measuring in terms of the percentage of combustible constituents in the said exhaust gases, the variation in the pressure on the said source of the last-named gases required to maintain the said flow of electric current.

7. The method of determining the amount of combustible constituents in waste gases from a combustion operation which comprises flowing into contact with a heated wire in an electric current flow balancing circuit a gas mixture containing a uniform volume of the said gases and a regulated amount of a diluent gas, and adjusting the percentage of the said diluent gas in the gas mixture flowing in contact with the said wire thereby to maintain a preselected temperature in the wire, said preselected temperature having been ascertained by passing a like volume of waste gases of known composition and a preselected volume of said diluent gas over said wire while supplying energy to said wire from a source of constant potential, and measuring the amount of the said diluent gas required to maintain such preselected temperature.

8. The method as defined in claim 7 in which the diluent gas is employed in amounts sufficient to reduce the combustible constituents of said mixture of diluent gas and combustion gases to not more than 7%.

9. The method set out in claim 2 in which the mixture of exhaust gases and combustion-supporting gas passed over the heated wire contains the last-named gas in amount substantially less than that required for the complete combustion of the combustible constituents of the exhaust gases.

10. The method of analyzing gases containing an unknown amount of combustible components, which comprises mixing a uniform volume of the said gases with a combustion supporting gas, passing the mixture over a highly heated electric resistance element, thereby causing combustion in the gas mixture in contact with the said element and inducing a corresponding temperature change in the element from a preselected standard ascertained by passing a like volume of gases of known composition admixed with a preselected volume of said combustion-supporting gas over said element, while supplying energy to said element from a source of constant potential, adjusting the amount of the combustion-supporting gas mixed with the gases of unknown composition to again bring the heated element to the said preselected standard temperature, and measuring the amount of combustion-supporting gas thus required.

11. The method of analyzing exhaust gases from an internal combustion motor of the automotive type which comprises flowing to a mixing zone a stream of the gases to be analyzed at a substantially constant pressure and flow rate, concurrently flowing under pressure to the mixing zone a stream of a combustion-supporting gas, flowing the resultant gas mixture in contact with a heated electric resistance element, thereby causing combustion in the gas mixture in contact with the said element and a corresponding temperature change in the element from a preselected standard temperature ascertained by passing a stream of exhaust gases of known composition at the same flow rate and admixed with a preselected volume of combustion supporting gas over said element, while supplying energy to said element from a source of constant potential, adjusting the pressure and flow rate of the stream of combustion-supporting gas flowing to the said mixing zone thereby to return the heated resistance element to the preselected standard temperature, and measuring the pressure of the combustion-supporting gas stream thus required.

12. The method of determining the amount of combustible constituents in waste gases from a combustion operation, which comprises flowing into contact with a heated electric resistance element in an electric current flow balancing circuit a gas mixture containing a uniform volume of the said gases and a regulated amount of an inert diluent gas, thereby causing a temperature change in the said heated resistance element from a preselected standard temperature ascertained by passing a like volume of waste gases of known composition in admixture with a preselected amount of said diluent gas over said element while supplying energy to said element from a source of constant potential, adjusting the amount of the said diluent gas to that required to again bring the resistance element to the said standard temperature, and measuring the amount of the diluent gas so required.

13. A process of analyzing the combustible content in a gas, which consists in withdrawing a portion of said gas by suction from the source of supply and feeding it under pressure through a conduit, permitting a part of the gas thus supplied through the conduit to escape to the atmosphere, conducting the remainder of the gas in the conduit in definite quantities continuously to a mixing chamber, pumping diluting air continuously into said mixing chamber in definite quantities, heating a wire of catalyzing material in a confined space electrically, conducting said mixture in said chamber to said space, and measuring the conductivity of the wire as a gauge as to the amount of combustible content in the gas.

ROBERT G. GRISWOLD.

CERTIFICATE OF CORRECTION.

Patent No. 2,084,954.  June 22, 1937.

ROBERT G. GRISWOLD.

It is hereby certified that error appears in the printed specification of the above numbered patent requiring correction as follows: Page 3, second column, line 28, strike out the word "gas"; page 4, first column, lines 70, 71 and 72, claim 6, strike out "in terms of the percentage of combustible constituents in the said exhaust gases, the variation in"; and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.